(12) United States Patent
Zami et al.

(10) Patent No.: US 6,658,175 B2
(45) Date of Patent: Dec. 2, 2003

(54) SWITCH FOR OPTICAL SIGNALS

(76) Inventors: Thierry Zami, 4, Allée du Clos d'Origny, 91300 Massy (FR); Nicolas Le Sauze, 23bis, rue du Coteau, 92370 Chaville (FR); Denis Penninckx, 5, rue Pasteur, 91620 Nozay (FR); Dominique Chiaroni, 20, Avenue de la Providence, 92160 Antony (FR); Amaury Jourdan, 6, Route des Postillons, 92310 Sevres (FR); Olivia Rofidal, Les Jardins de Bures - BâtB-Esc. F 19 rue de la Hacquinière - 91440, Bures-sur-Yvette (FR)

( * ) Notice: Subject to any disclaimer, the term of this patent is extended or adjusted under 35 U.S.C. 154(b) by 295 days.

(21) Appl. No.: 09/922,749

(22) Filed: Aug. 7, 2001

(65) Prior Publication Data

US 2002/0041727 A1 Apr. 11, 2002

(30) Foreign Application Priority Data

Aug. 10, 2000 (FR) .............................. 00 10529

(51) Int. Cl.[7] ................................. G02B 6/26
(52) U.S. Cl. .......................................... 385/16; 385/24
(58) Field of Search ................ 385/15–19, 24, 385/27, 42; 359/109, 110, 113, 124

(56) References Cited

U.S. PATENT DOCUMENTS 6,574,386 B1 * 6/2003 Sufleta ........................ 385/16

6,591,028 B2 * 7/2003 Lin et al. ..................... 385/15
6,597,824 B2 * 7/2003 Newberg et al. ............ 385/16

FOREIGN PATENT DOCUMENTS

WO      WO 00/05832      2/2000

OTHER PUBLICATIONS

Jinno M et al.: "Ultra–Wide–Band WDM Networks and Supporting Technologies" Core Networks and Network Management, Amsterdam: IOS Press, NL, 1999, pp. 90–97.

* cited by examiner

Primary Examiner—Khiem Nguyen
(74) Attorney, Agent, or Firm—Sughrue Mion, PLLC

(57) ABSTRACT

The invention relates to a switch (112) for optical signals and which has a number of outputs at least equal to the number of inputs and include means whereby an input signal is routed to at least one of those outputs. Each input receives information modulating optical carriers at different wavelengths. The switch (112) includes means ($126_{11}$, $126_{12}$, ..., $126_{NB}$) for grouping all the carriers received into non-contiguous subsets of carriers ($G_{11}$, ..., $G_{1B}$, ..., $G_{N1}$, ..., $G_{NB}$) and means ($129_1$, $129_2$, ..., $129_{NB}$) for selecting blocks of carriers from the same subset of carriers. The information corresponding to each subset of optical carriers is thus routed in blocks to the same subset output.

Switching the carriers at the subset level improves the quality of the output signal and limits the number of components for the same total quantity of information switched.

13 Claims, 10 Drawing Sheets

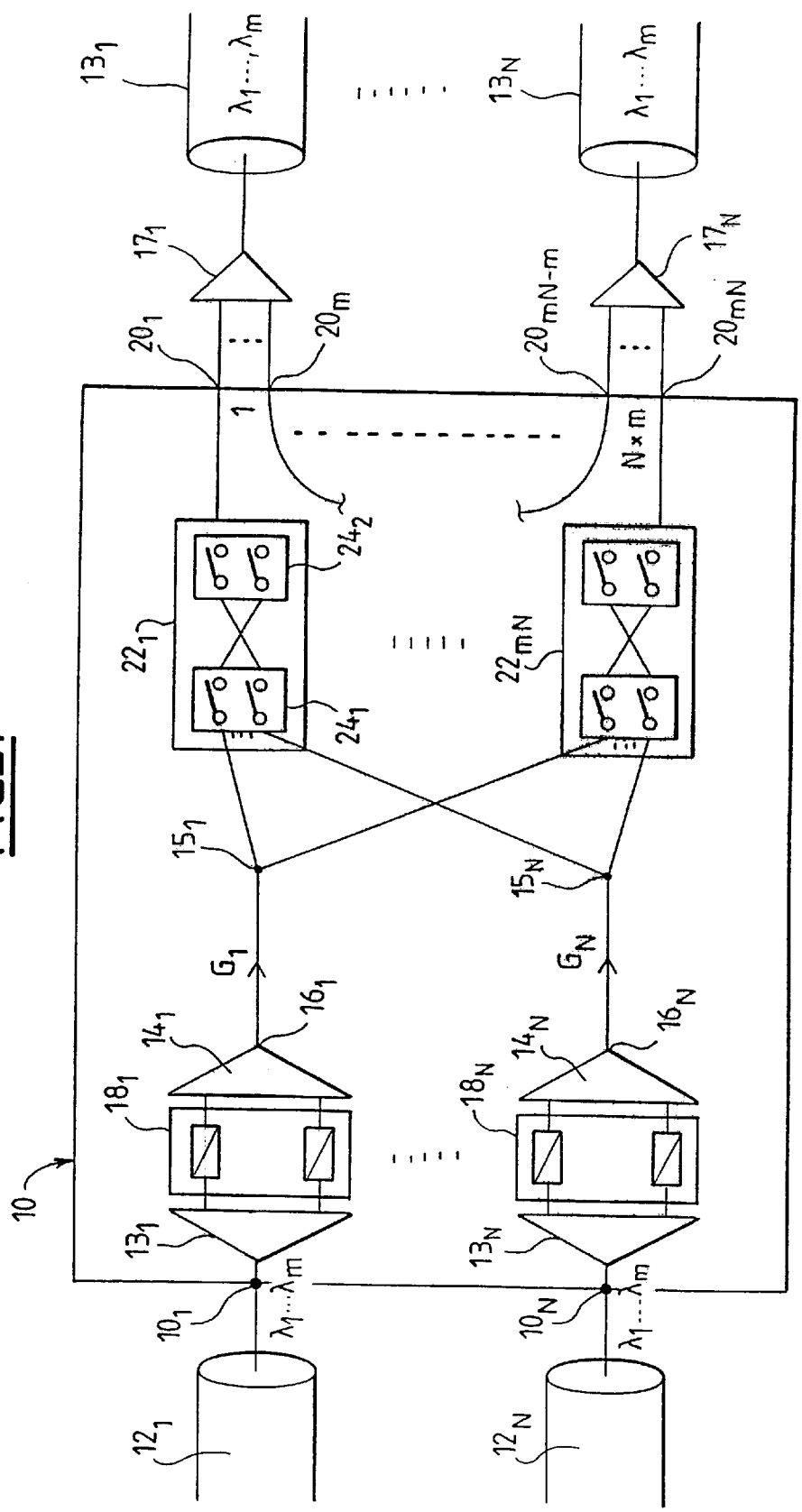

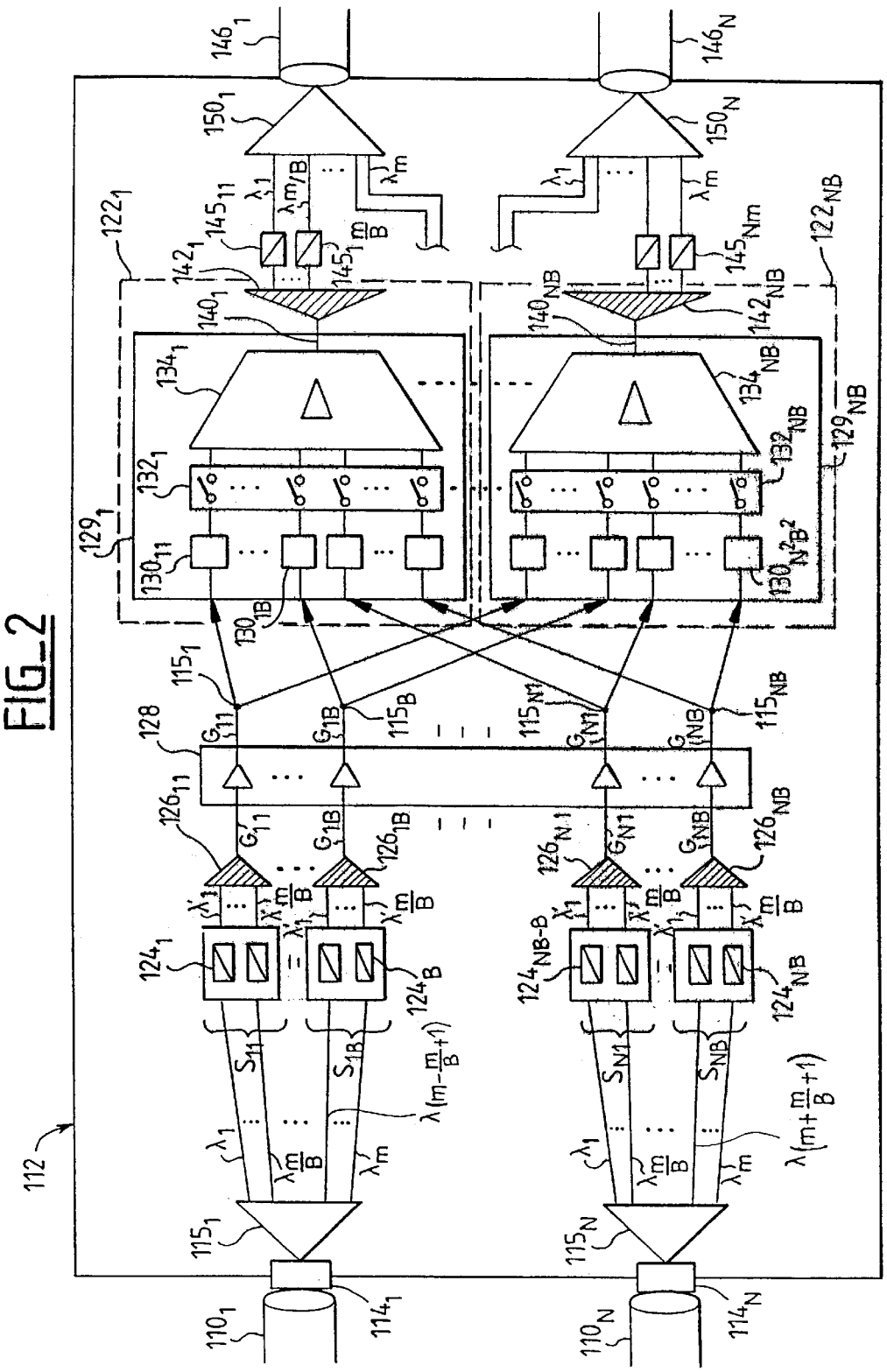
FIG_2

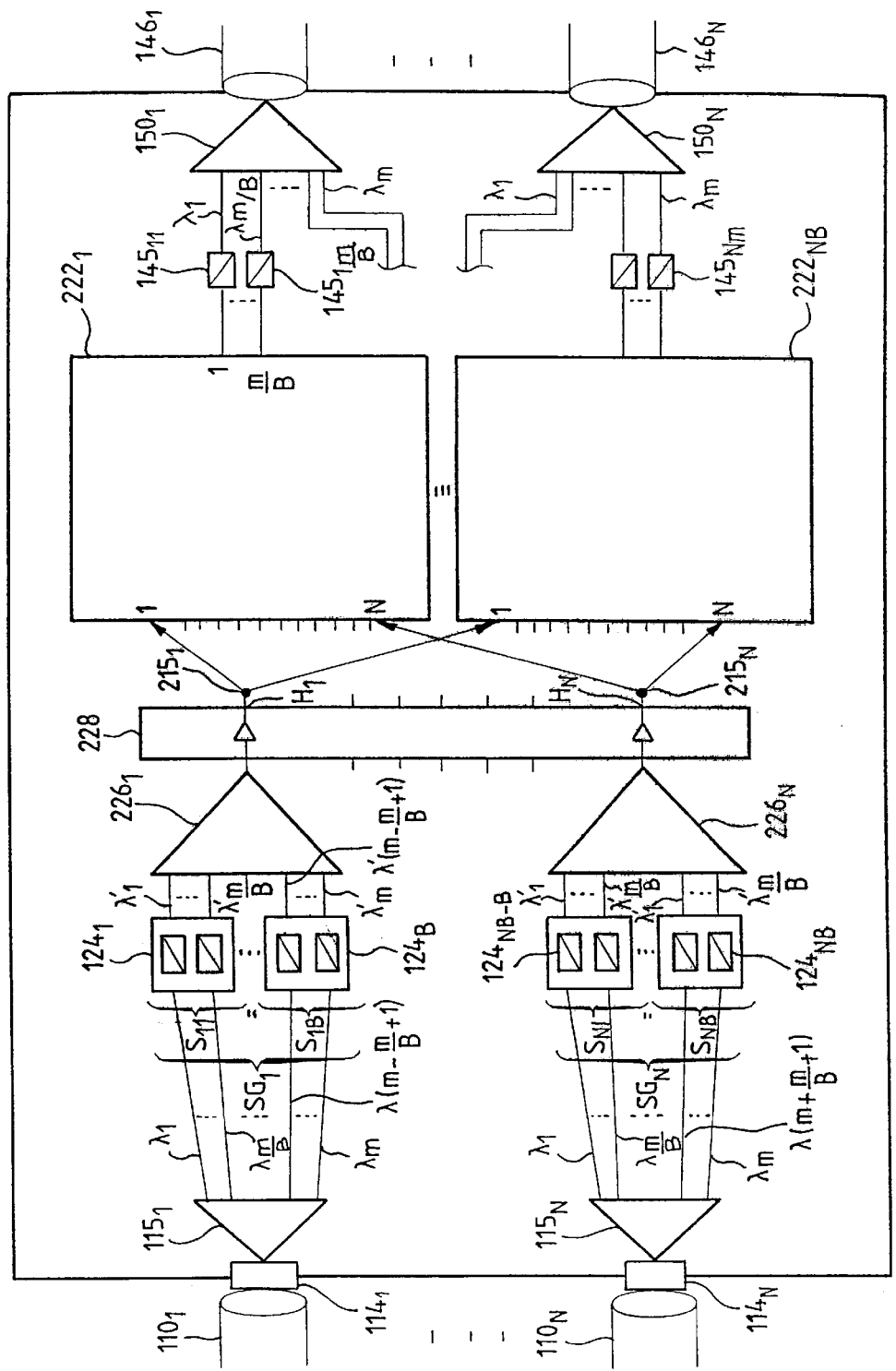
FIG_3

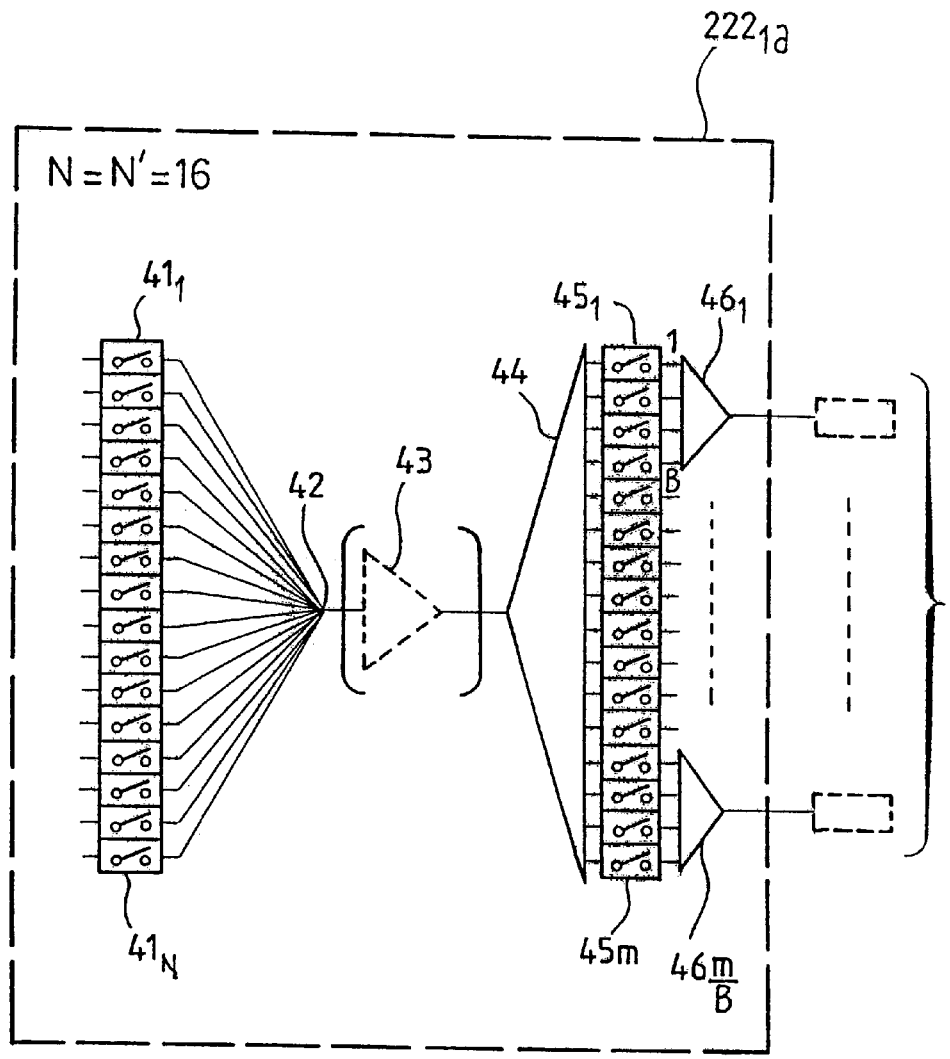
FIG_4

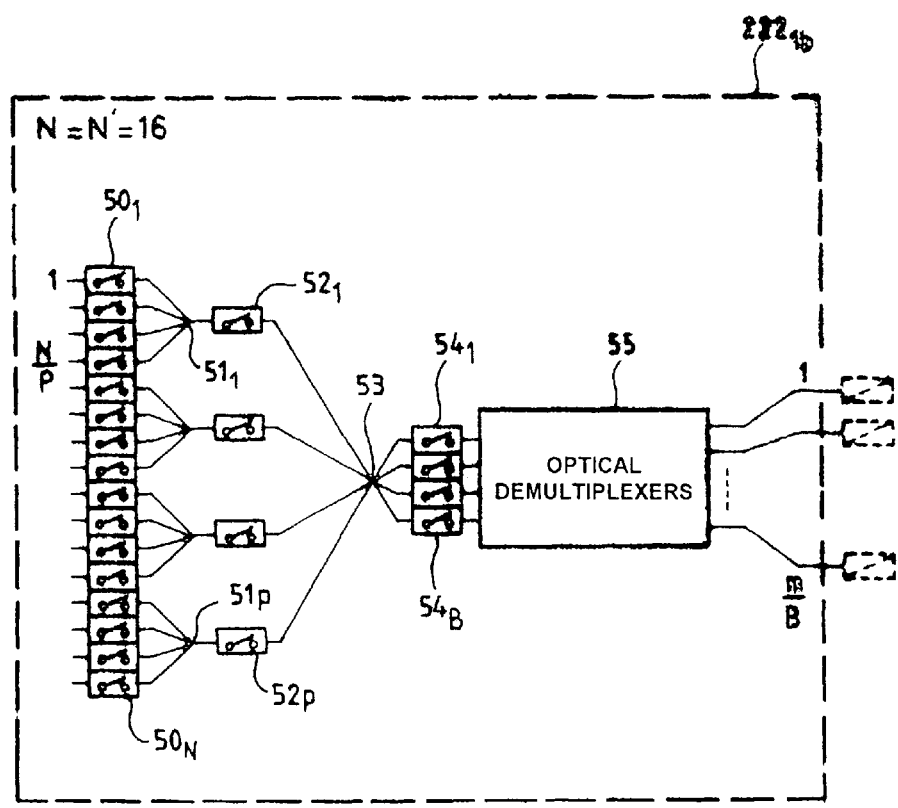
FIG_5

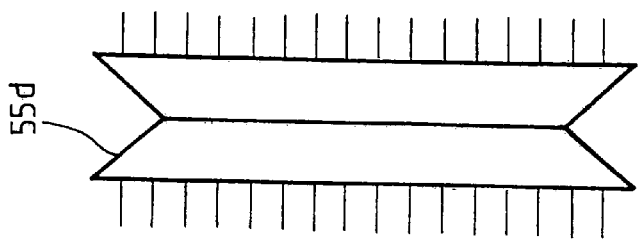
FIG_9
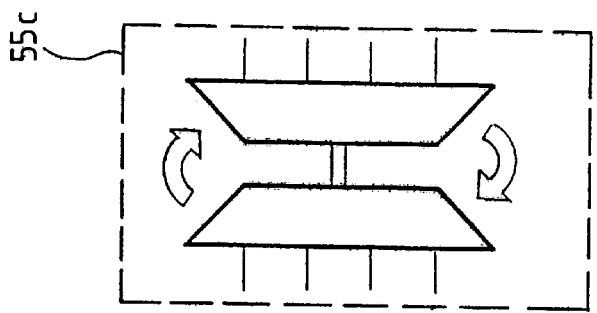
FIG_8
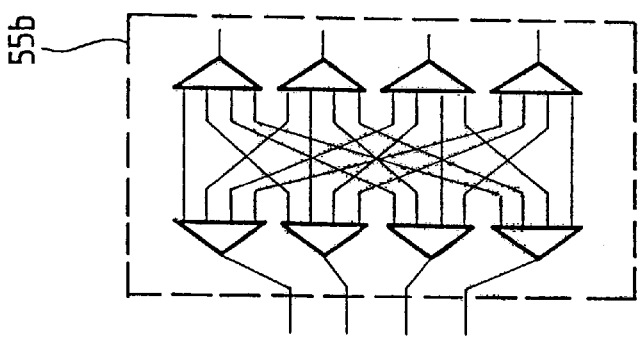
FIG_7
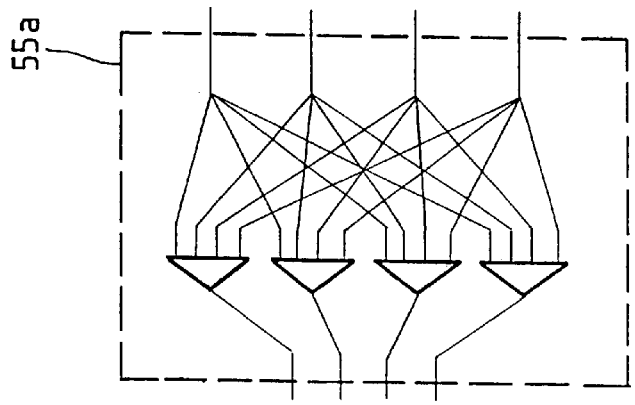
FIG_6

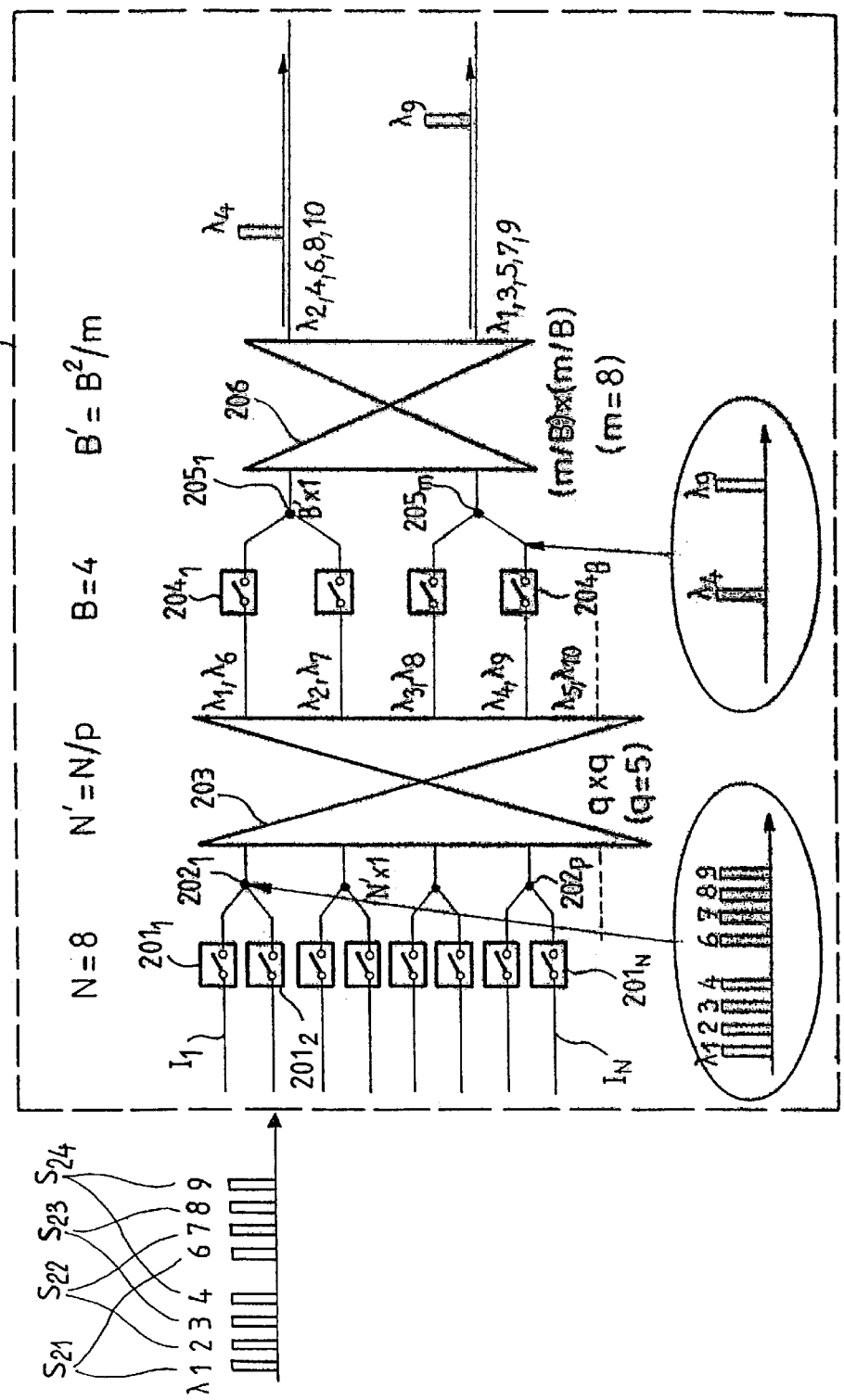

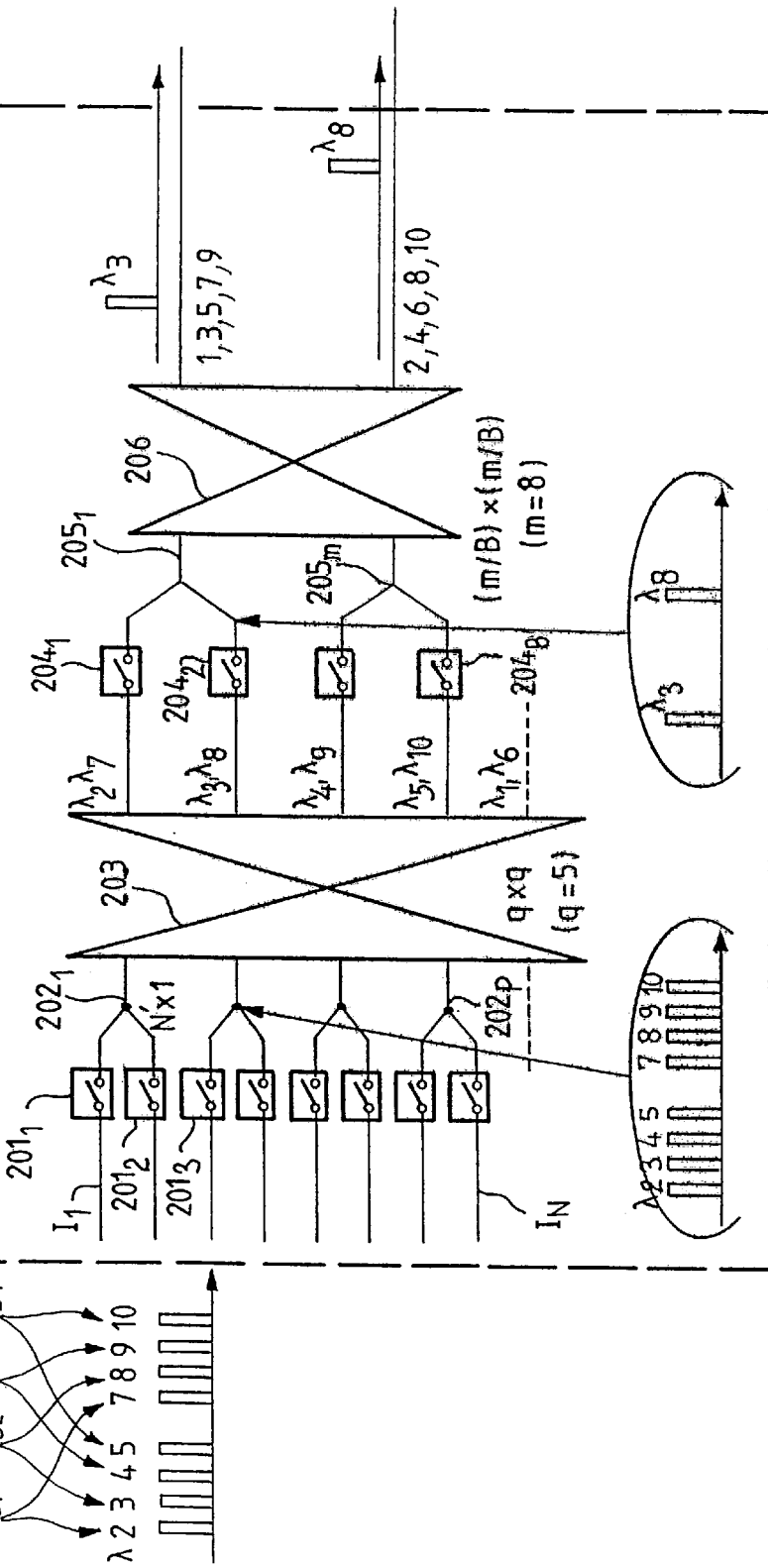
FIG_11

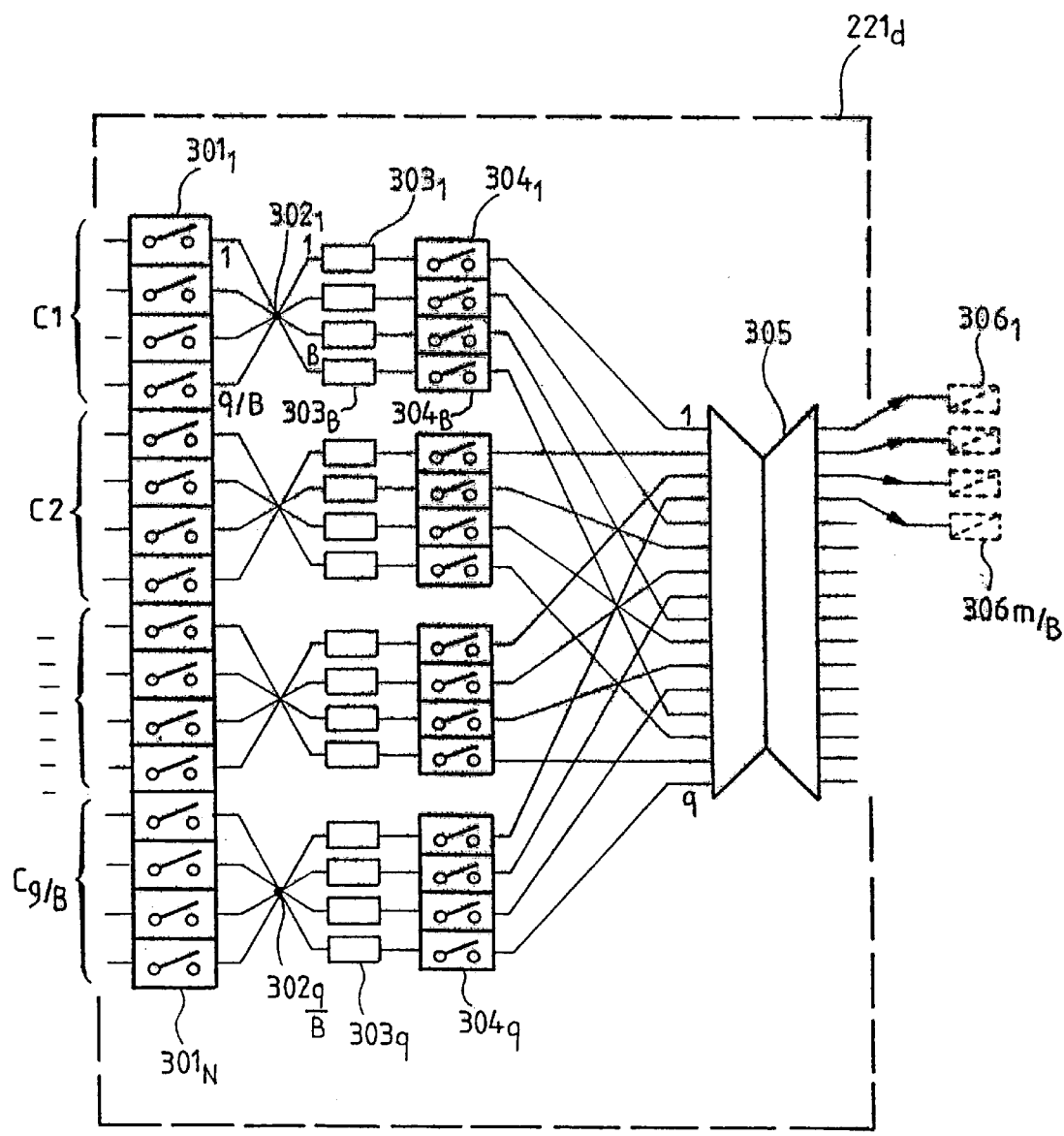
FIG_12

SWITCH FOR OPTICAL SIGNALS

The invention relates to a switch for optical signals and more particularly to a switch for packet signals.

Telecommunications are expanding considerably. More and more users (individuals and businesses) are transmitting an increasing number of messages in telecommunication networks. Also, the messages include an ever-increasing quantity of information, for example when sending pictures. To respond to this growing demand for information bit rate, telecommunications network operators are using optical signal transmission, which modulates optical signals, generally produced by lasers, in accordance with the information to be transmitted, after which the modulated signals propagate in a network of conductors or optical fibers.

Transmitting signals optically has several advantages. In particular, the attenuation of the signal during transmission is less than in the case of electrical signals and the bandwidth of optical fibers is greater. It is therefore possible to transmit several carriers with different wavelengths simultaneously in the same fiber. This technique, known as wavelength division multiplexing, achieves information bit rates of the order of 1 terabit/s.

In parallel with wavelength division multiplexing, time division multiplexing enables simultaneous transmission of several calls on the same carrier. In packet mode, each carrier transmits packets relating to different messages whose information has been divided up into packets, each packet being launched into the network with a header indicating its destination. When the packet passes through a switching device, the device dedicates resources to routing the packet during the time period needed to switch the packet to a requested output. Those resources are then freed again for switching another packet. Because the packets are of limited duration, of the order of 1 microsecond, many calls can be transmitted in a short time period. This routing policy is currently used on the largest of all networks: the Internet.

Implementing switches using optical technology has been envisaged. Two types of switch can be distinguished:
  cross-connect switches that set up semi-permanent connections between trunks routing a large number of multiplexed messages or calls, and
  switches capable of routing calls or messages individually, i.e. that can be reconfigured for each new call or each new message.

The document JINNO M ET AL.: "ULTRA-WIDE-BAND WDM NETWORKS AND SUPPORTING TECHNOLOGIES" CORE NETWORKS AND NETWORK MANAGEMENT, AMSTERDAM: IOS PRESS, NL, 1999, pages 90–97, XP000829416 ISBN/90-5199-497-4 describes a cross-connect switch that receives and switches, without demultiplexing them, optical signals consisting of 16 carriers having different wavelengths. This switch cannot route individual calls or messages. Also, it is designed for very low switching speeds.

The invention relates to switches whose function is to route calls or messages individually. Also, if the signals are transmitted in packet mode, the switch must route all the packets present at the respective inputs to designated outputs and then change configuration to route subsequent packets.

FIG. 1 is a block diagram of a prior art switch $10$ that implements the above function. It has N inputs $10_1$, $10_2, \ldots 10_N$ each of which is adapted to be connected to a respective optical fiber $12_1$ $12_2, \ldots, 12_N$. Each fiber transmits m channels consisting of m respective carriers at different wavelengths $\lambda_1, \lambda_2, \ldots, \lambda_m$ modulated by pulses and by packets.

Each input $10_1, 10_2, \ldots 10_N$ is connected to a respective corresponding optical demultiplexer $13_1, \ldots, 13_N$ which separates the m carriers received at that input. Each carrier is then transmitted to a wavelength converter and regenerator device $18_1, \ldots, 18_N$. The converted signals are recombined by an optical multiplexer $14_1, \ldots, 14_N$. N signals $G_1, G_2, \ldots, G_N$ are obtained at the output of these multiplexers. The N signals are then broadcast in m.N directions by respective couplers $15_1, \ldots, 15_N$. They are then routed to m×N respective outputs $20_1, 20_2, \ldots, 20_{mN}$ of the switch $10$ by m×N respective selector units $22_1$, $22_2, \ldots, 22_{mN}$. Each selector unit is in two parts, namely, for the unit $22_1$, for example, an input selector first device $24_1$ and a wavelength selector second device $24_2$.

For example, the input selector device $24_1$ has N inputs each of which is connected to respective outputs $16_1$ to $16_N$ of the converter and regenerator devices $14_1, 14_2, \ldots 14_N$. The input selector device $24_1$ selects at most one of the N received signals $G_1, G_2, \ldots, G_N$. The selected signal is then routed to the wavelength selector device $24_2$. From the m carriers of the signal selected, the latter device selects one carrier to be transmitted to an output $20_1$ of the switch $10$. The signals supplied at the outputs $20_1, 20_2, \ldots, 20_{mN}$ are then grouped into groups of m signals having different wavelengths $\lambda_1, \lambda_2, \ldots, \lambda_m$ by multiplexers $14_1, \ldots, 14_N$ so that they can be transmitted via optical fibers $13_1, \ldots, 13_N$.

In other embodiments, the number of output fibers and the number of channels per output fiber can be different from N and m, respectively. On the other hand, the total number m.N of output channels is equal to the total number of input channels.

Each input selector device $24_1$, etc. includes at least N selector units, for example optical amplifiers used as optical gates. Each wavelength selector device $24_2$, etc. includes at least m selector units consisting of optical amplifiers used as optical gates, for example, and wavelength-selective means. The switch $10$ therefore includes at least m.N.(m+N) optical amplifiers. This large number of components is not favorable to reliability, simplicity or optimum fabrication cost. Also, each signal $G_1, G_2, \ldots, G_N$ is broadcast to an input of each of the m.N input selector units $22_1, 22_2, \ldots, 22_{mN}$. A consequence of this is that the power of each signal $G_i$ is divided by a factor m.N.

Furthermore, after the selection effected by the first device $24_1$, the selection operated by the second device $24_2$ further divides the power of the signal by a factor equal at most to a value from N to m. Accordingly, in total, the power of each input signal is attenuated by at least a factor N.m.max(N,m). This reduction in the power of the signals in the selector device produces a low signal/noise ratio and therefore distortion, which becomes problematic for signals at very high bit rates, for example bit rates higher than 10 Gbit/s.

An object of the invention is to reduce significantly the number of times each signal is divided for the same total bit rate processed in this kind of switch. This increases the signal/noise ratio and higher information bit rates can therefore be achieved.

The invention provides a switch for optical signals, the switch including a number of outputs at least equal to the number N of inputs, for routing an input signal to at least one output, each input being adapted to receive signals modulating optical carriers having m different wavelengths, characterized in that it includes:
  means for grouping all of the carriers received at an input of the switch into non-contiguous subsets of carriers;

selector units for routing in blocks the signals corresponding to each subset of optical carriers; and means for dividing each subset and then transmitting all the carriers of that subset to the same output of the switch.

The above switch processes a whole subset of the set of wavelengths, i.e. a plurality of wavelengths, simultaneously, enabling the same single component to be used for each function, such as amplification and switching, instead of one component for each wavelength, and this applies up to the destination output. Accordingly, the signals are divided less than in the conventional optical switch shown in FIG. 1.

In the prior art switch, the factor by which the power of each carrier is divided is m×N before the input selector device $24_1$. Between the input selector device $24_1$ and a wavelength selector second device $24_2$, the division factor is whichever is the greater of m and N. The embodiments of the invention show that in the switch according to the invention the division factor is reduced to N×B before the input selector stage and to B between the input selector stage and the stage for selecting the subset of wavelengths, B being the total number of subsets of carriers per optical fiber. For example, if the set of carriers comprises 16 carriers (m=16), and if each subset includes four carriers (B=4), the factor by which each signal is divided will be less than in the prior art switch shown in FIG. 1 by the following amount:

$$\frac{m \cdot \text{Max}(N, m)}{B^2} = \frac{16 \times 4}{4 \times 4} = 4$$

One particular embodiment of the switch according to the invention is characterized in that it further includes:

means for grouping all the subsets of carriers into non-contiguous groups of subsets;

means for routing in blocks the information corresponding to a plurality of subsets of carriers; and means for selecting a single subset of carriers per output of the switch.

The above switch processes a plurality of subsets of carriers at the same time, enabling the same single component to be used for each function, such as amplification and switching, instead of one component for each subset.

Other features and advantages of the invention will become apparent in the course of the following description of embodiments of the invention, which description is given with reference to the accompanying drawings, in which:

FIG. 1, already described, is a block diagram of a prior art optical switch.

FIG. 2 is a block diagram of a first embodiment of an optical switch according to the invention, using subsets of carriers.

FIG. 3 is a block diagram of a second embodiment of an optical switch according to the invention, using groups of subsets of carriers.

FIGS. 4, 5, 10, 11, 12, 13 are block diagrams of various embodiments of switching means that can be used in the second embodiment.

FIGS. 6 to 9 are block diagrams of different variants of one portion of the embodiment shown in FIG. 5.

Figure 13:
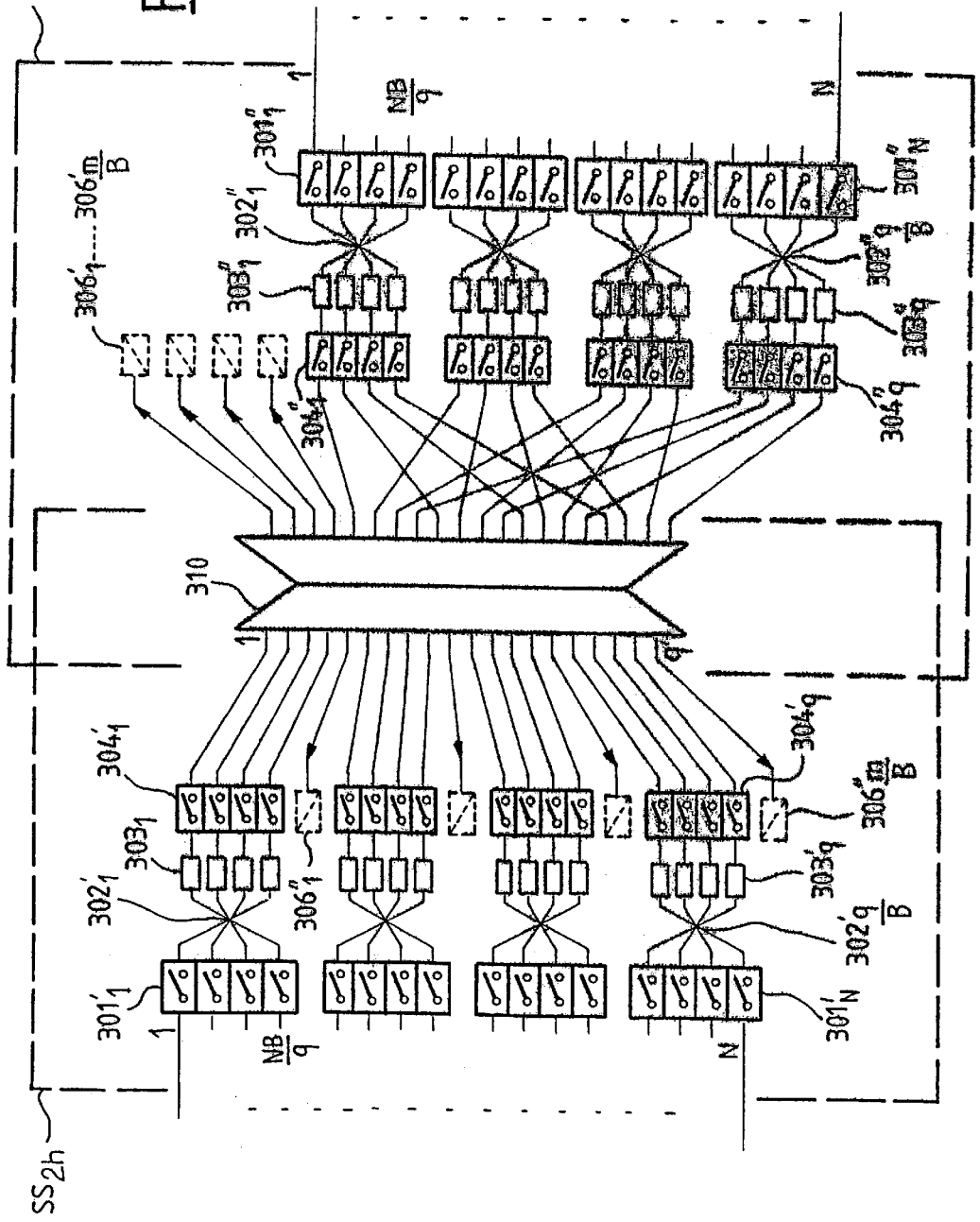

FIG. 2 is a block diagram of a first embodiment of a switch 112 in accordance with the invention. It has N inputs each connected to an optical fiber $110_1$, $110_2$, ..., $110_N$ transmitting wavelength division multiplexed signals. Each optical fiber transports m carriers with different wavelengths $\lambda_1, \lambda_2, \ldots, \lambda_m$. Each carrier transports a series of messages, each message having a different destination. The switch must therefore be configured differently for each message. There are two techniques which can be used to group carriers in the same subset of carriers:

grouping different messages having the same destination, or grouping message segments within the same message.

It is also possible to combine the above two techniques. To be more precise, the second technique entails dividing each message into a plurality of parts, each of which parts is transmitted by a carrier at a different wavelength from those of the other carriers transmitting the other parts of the message. The carriers being transmitted simultaneously to the same destination, they form within each optical fiber a subset of carriers to be routed to the same output.

In the embodiment shown in FIG. 2, all the optical fibers transmit exactly the same number m of carriers and the messages have already been divided upstream of the switch, i.e. in the network. A different embodiment could include a time-division demultiplexer at the input of the switch to distribute a message at bit rate D across f carriers having different wavelengths and each having a bit rate D/f, with a time-division multiplexer at the output of the switch to reconstitute the message on a single carrier at bit rate D.

For example, for the m carriers arriving via the fiber $110_1$, the switch 112 uses B subsets of carriers $S_{11}, \ldots, S_{1B}$. For the m carriers arriving via the fiber $110_N$, the switch 112 uses B subsets of carriers $S_{N1}, \ldots, S_{NB}$. In this example, all subsets comprise m/B signals with m/B respective different wavelengths $\lambda_1, \lambda_2, \ldots, \lambda_{m/B}$.

Each input of the switch 112 is connected to a respective synchronization device $114_1$, $114_2$, ..., $114_N$ whose function is to synchronize all packets transported by the carriers arriving at that input with a clock (not shown) of the switch, in order for the whole of the switch to function synchronously. The output of each synchronization device $114_1$, $114_2$, ..., $114_N$ is connected to the input of a corresponding optical demultiplexer $115_1$, $115_2$, ..., $115_N$, for example using an interference filter, for separating the m carriers received at each input, restoring them at m respective outputs. Those m carriers are then grouped into B subsets $S1_1, \ldots, SN_B$ each consisting of m/B carriers.

Each subset $S1_1, \ldots, SN_B$ of carriers is transmitted to a respective wavelength converter and regenerator device $124_1, \ldots, 124_{NB}$. Each converter and regenerator device includes, for each of m/B carriers it receives, a regenerator that amplifies and reshapes the optical pulses of the signal. It further includes a wavelength converter that changes the wavelength of the carrier.

For example, the converter and regenerator device $124_1$ receives m/B carriers with respective wavelengths $\lambda_1$, $\lambda_2, \ldots, \lambda_{m/B}$ and restores m/B carriers with respective wavelengths $\lambda'_1, \lambda'_2, \ldots, \lambda'_{m/B}$. The converter and regenerator device $124_B$ receives m/B carriers with respective wavelengths $\lambda_{m-(m/B)+1}, \ldots, \lambda_m$ and restores m/B carriers with respective wavelengths $\lambda'_1, \lambda'_2, \ldots, \lambda'_{m/B}$. Accordingly, the output wavelengths of all the wavelength converters of the converter and regenerator devices $124_1, \ldots, 124_{NB}$ are exactly the same, for all the subsets of carriers $S_{11}, \ldots, S_{1B}$.

Subsets of carriers having the same wavelengths $\lambda'_1, \ldots, \lambda'_{m/B}$ are therefore obtained. This simplifies the fabrication of the optical switch in accordance with the invention because the number of wavelengths processed afterwards is reduced from m to m/B, for example enabling the use of amplifiers operating with a narrower wavelength window than in the prior art switch. They are therefore less costly.

The carriers of the subsets $S_{11}, \ldots, S_{NB}$ obtained at the outputs of the respective regenerator devices $124_1, \ldots, 124_{NB}$ are grouped by a respective multiplexer $126_{11}, \ldots, 126_{NB}$, each of these multiplexers corresponding to one subset of carriers. Thus at the output of the multiplexers $126_{11}, 126_{12}, \ldots, 126_{NB}$ a total of N×B signals $G_{11}, \ldots, G_{1B}, \ldots, G_{N1}, \ldots, G_{NB}$ are obtained, each corresponding to one subset of carriers.

In this example, a subset of carriers transmits a message that is divided into several parts, and each part of which is transmitted on one carrier of the subset. The carriers relating to the same message are therefore grouped into a single signal $G_{ij}$. It is then possible to route all the parts of the message to the same output fiber $146_1, \ldots,$ or $146_N$ by routing the signal $G_{ij}$ to that fiber.

The signals $G_{11}, \ldots, G_{1B}, \ldots, G_{N1}, \ldots, G_{NB}$ from the multiplexers $126_{11}, 126_{12}, \ldots, 126_{NB}$ are amplified by erbium-doped fiber amplifiers 128. This type of amplifier has the advantage of amplifying the signals with a signal/noise ratio and an output power much higher than those of semiconductor optical amplifiers. After they have been amplified by the amplifiers 128, the signals $G_{11}, \ldots, G_{1B}, \ldots, G_{N1}, \ldots, G_{NB}$ are broadcast by N respective broadcasters $115_1, \ldots, 115_N$ and then routed to the selector units $122_1, 122_2, \ldots, 122_{NB}$ by means of optical fibers or optical conductors such as planar waveguides (to be more precise planar optical couplers).

Each selector unit $122_1, \ldots, 122_{NB}$ includes:

a respective switching device $129_1, \ldots, 129_{NB}$ which selects one of the subsets of carriers from the N.B subsets broadcast by the broadcasters $115_1, \ldots, 115_{NB}$; and a demultiplexer $142_1, \ldots, 142_{NB}$ which separates the m/B carriers with wavelengths $\lambda'_1, \lambda'_2, \ldots, \lambda'_{m/B}$ of the respective subset $129_1, \ldots, 129_{NB}$ selected by the space switching device, and which applies those carriers to m/B respective converter and regenerator devices $145_{11}, \ldots, 145_{1m/B}$.

Each space switch device $129_i$ includes:

A set of NB delay units $130_{ij}$ for assigning to each signal received a time-delay that is a function of its priority. The priority order is included in the signal Gij itself, for example. The higher the priority, the shorter the time-delay.

A set $132_i$ of NB optical gates for choosing only one of the delayed signals and therefore validating only one input of the space switching device $129_i$. The gates consist of semiconductor optical amplifiers. A semiconductor optical amplifier, whether its gain is constant or not, is activated when the signal that it receives must be selected for transmission. Only one gate is activated at a time. Note that the delay units $130_{ij}$ retain the signals that have not been selected. In the absence of these delay units, the unselected signals would be lost irrecoverably.

A switched amplifier device $134_i$ having NB inputs connected to respective outputs of the set of gates $132_i$. Its role is to impart to the transmitted signal sufficient power at the stage of recombining the outputs of the various optical gates $132_i$ in a way that avoids addition of optical noise from the amplifiers. The output of the amplifier device $134_i$ constitutes an output $140_i$ of the space switching device $129_i$.

Accordingly, compared to the prior art switch shown in FIG. 1, the total number of selection operations is reduced, since the number of selector units $122_1, \ldots, 122_{NB}$ is N×B whereas in the prior art switch the total number of selector units is N×m, B being a submultiple of m. In other words, processing the carriers of a subset at the some time and transmitting them at the same time considerably simplifies the implementation of the optical switch, can reduce the number of components, and improves signal processing quality.

The total number of selector units $122_1, 122_2, \ldots, 122_{NB}$ is N.B and each selector unit $122_i$ has N.B inputs. Each signal Gij is applied to a corresponding input ij of each selector unit $122_1, 122_2, \ldots, 122_{NB}$. Accordingly, the signal $G_{11}$ coming from an output of one of the amplifiers 128 is transmitted to the inputs indexed 11 of the selector units $122_1, 122_2, \ldots, 122_{NB}$. Each input of each selector unit is associated with a delay unit $130_{11}, \ldots, 130_{N^2B^2}$ for assigning to each received signal a time-delay that is a function of its priority. The priority order is included in the signal Gij itself, for example. The higher the priority the shorter the time-delay.

The demultiplexer $142_i$ therefore supplies at m/B outputs the carriers of a subset of carriers whose wavelengths are respectively $\lambda'_1$ to $\lambda'_{m/B}$. Then, each carrier is processed individually by a respective wavelength converter and regenerator device $145_{11}, 145_{12}, \ldots, 145_{Nm}$ implementing functions similar to those of a converter and regenerator device $124_1, \ldots, 124_{NB}$. Each includes a converter for modifying the wavelengths of the carriers so that m carriers with different wavelengths $\lambda_1, \lambda_2, \ldots, \lambda_m$ can be transmitted in the same fiber.

A respective multiplexer $150_1, 150_2, \ldots 150_N$ combines m carriers with wavelengths $\lambda_1, \lambda_2, \ldots \lambda_m$ provided by B selector units $122_i$ so that each output fiber $146_1$ to $146_N$ actually transmits the m carriers on the m input wavelengths. Note that the number of output wavelengths is generally equal to the number of input wavelengths and that each wavelength $\lambda_i$ received at the input appears at the output. However, it is possible to choose output wavelength values that are different from the input wavelength values.

FIG. 3 is a block diagram of a second embodiment 212 using N' groups of B' subsets of B carriers. For example, the switch 212 groups the m carriers arriving via the input fiber $110_1$ into B subsets $S_{11}, \ldots, S_{1B}$ each comprising m/B carriers. Each groups the m carriers arriving via the input fiber $110_N$ into B subsets $S_{N1}, \ldots, S_{NB}$. All the subsets comprise m/B signals having m/B respective different wavelengths $\lambda_1, \lambda_2, \ldots, \lambda_{m/B}$.

The switch 212 then groups these NB subsets into N' groups each including B' subsets of carriers. For example, in the embodiment shown in FIG. 3, N'=N and B'=B. The group $SG_1$ therefore includes the subsets $S_{11}, \ldots, S_{1B}$. The group $SG_N$ includes the subsets $S_{N1}, \ldots, S_{NB}$.

Components that are similar to those of the switch 112 carry the same reference numbers. The switch 212 has:

N inputs each connected to an optical fiber $110_1, 110_2, \ldots, 110_N$ transmitting wavelength division multiplexed signals;

N synchronization devices $114_1, 114_2, \ldots, 114_N$ analogous to those of the switch 112 (FIG. 2);

N wavelength converter and regenerator devices $124_1, \ldots, 124_{NB}$ analogous to those of the switch 112 (FIG. 2);

N multiplexer devices $226_1, \ldots, 226_N$;

N optical amplifiers 228;

N broadcasters $215_1, \ldots, 215_N$;

N selector units $222_1, \ldots, 222_{NB}$;

N.m wavelength converter and regenerator devices $145_1, \ldots, 145_{Nm}$ analogous to those of the switch 112 (FIG. 2);

N optical multiplexers $150_1, \ldots, 150_N$ analogous to those of the switch 112 (FIG. 2); and N outputs each connected to an optical fiber $146_1, 146_2, \ldots, 146_N$ transmitting wavelength division multiplexed signals.

Each selector unit $222_1, \ldots, 222_{NB}$ has:

N inputs connected to N respective outputs of N amplifiers 228 supplying N respective signals $H_1, \ldots, H_N$; and m/B outputs connected to m/B respective inputs of one of the wavelength converter and regenerator devices $145_{11}, \ldots, 145_{Nm}$.

This embodiment differs from the first one in that the broadcast stage includes N multiplexers $226_1$, $226_1$, ..., $226_N$ with m inputs and N amplifiers 228 instead of N.B multiplexers $126_1$, ..., $126N$ with m/B inputs and N.B amplifiers 128. However, additionally, the NB selector units $222_1$, ..., $222_{NB}$ are different because they are optimized to exploit further the fact that the subsets of carriers are grouped together. Each selector unit $222_1$, ..., $222_{NB}$ can select a plurality of subsets of carriers simultaneously, and not only one subset, as in the switch 112.

FIG. 4 is a block diagram of a first embodiment $222_{1a}$ of the selector unit $222_1$ taken by way of example, for N=N'=16. It includes:

N optical gates $41_1$, ..., $41_N$, connecting N respective inputs of the unit $222_{1a}$ to a coupler 42 having N inputs and one output;

an optical erbium-doped fiber optical amplifier 43 having an input connected to the output of the coupler 42;

a demultiplexer 44 having an input connected to the output of the amplifier 43 and having N outputs;

m optical gates $45_1$, ..., $45_m$ connected to respective outputs of the demultiplexer 44; and m/B multiplexers $46_1$, ..., $46_{m/B}$ each with B inputs and one output, each input being connected to a respective output of the demultiplexer 44 and the m/B outputs of the demultiplexers constituting the outputs of the selector unit $222_{1a}$.

The gates $41_1$, ..., $41_N$ are used to select a group of subsets of carriers from $SG_1$, ..., $SG_N$. In the example shown, N is equal to 16. The gates $45_1$, ..., $45N$ select m/B carriers and supply them to the m/B respective multiplexers $461$, ..., $46m/B$. The number of inputs of each multiplexer $461$, ..., $46m/B$ is chosen to be equal to the number of carriers per subset (which is four, in the example shown in this figure).

FIG. 5 is a block diagram of a second embodiment $222_{1b}$ of the selector unit $222_1$ taken byway of example, for N=N'=16. It includes:

N optical gates $50_1$, ..., $50_N$ divided into groups of N/p; each group of N/p gates connects N/p respective inputs of the unit $222_{1b}$ to a coupler $51_1$, ..., $51_p$ having N/p inputs and one output (the figure shows an example in which p=4 and N=16);

p optical gates $52_1$, ..., $52_p$ having their inputs connected to respective outputs of couplers $51_1$, ..., $51_p$;

a coupler 53 having p inputs connected to respective outputs of the gates $52_1$, ..., $52_p$ and having B outputs;

B optical gates $54_1$, ..., $54_B$ having their inputs connected to respective outputs of the coupler 53; and a demultiplexer device 55 having B inputs connected to respective outputs of the optical gates $54_1$, ..., $54_B$ and having m/B outputs constituting the outputs of the unit $222_{1b}$.

This embodiment of the switch in accordance with the invention requires fewer optical gates than the prior art switch shown in FIG. 1. Each selector unit has N+2.B optical gates, i.e. a total of N.B.(N+2B) gates for the whole of the switch. Under these conditions, if N=16 and B=4, the total number of gates is 1 536. In a conventional switch, for which N=16 and m=16, the number of optical gates used for each selector unit is m.N. (m+N)=8 192.

Accordingly, in this example, the number of optical amplifiers of the switch according to the invention is one fifth that of the prior art switch, all other things being equal.

In the example shown in FIG. 5, N=16 and B=p=4. FIGS. 6 to 9 are block diagrams of different embodiments of the demultiplexer device 55 when m=16 and B=4.

FIG. 6 shows an embodiment 55a including:

a first stage of B demultiplexers each having one input and m/B outputs; and a second stage of m/B couplers each having B inputs connected to a respective output of each of the demultiplexers of the first stage and having m/B outputs constituting the outputs of the device 55a.

FIG. 7 shows an embodiment 55b including:

a first stage of B demultiplexers each having one input and m/B outputs; and a second stage of m/B multiplexers each having B inputs connected to a respective output of each of the demultiplexers of the first stage and having m/B outputs constituting the outputs of the device 55b.

FIG. 8 shows an embodiment 55c including:

if the subsets of carriers correspond to adjacent wavelengths:

a first stage consisting of a wavelength band multiplexer having B inputs and one output; these inputs constitute the inputs of the device 55c; and a second stage consisting of a carrier interleaver having one input and m/B outputs, the inputs of this interleaver being connected to respective outputs of the first stage and its outputs constituting the outputs of the device 55c; or if the subsets of carriers correspond to interleaved wavelengths:

a first stage consisting of a carrier interleaver having B inputs and one output; these inputs constitute the inputs of the device 55c; and a second stage consisting of a wavelength band multiplexer having one input and m/B outputs, the inputs of this multiplexer being connected to the outputs of the first stage and its outputs constituting the outputs of the device 55c.

FIG. 9 shows an embodiment 55d including an array of waveguides having at least m waveguides in its internal structure. The array must have at least B inputs and m/B outputs, m/B of those outputs constituting the outputs of the device 55c. Note that, depending on the respective arrangements of the inputs and outputs used, this device can demultiplex subsets of carriers corresponding to adjacent or interleaved wavelengths.

FIG. 10 is a block diagram of a third embodiment $222_{1c}$ of the selector unit $221_1$ considered by way of example. In this example, the number N of groups is equal to 8 and the number N' of subsets per group of subsets of carriers is equal to 2. The unit includes:

a space selector stage consisting of N optical gates $201_1$, ..., $201_N$ divided into groups of N/p; the gates are connected to N respective inputs of the unit $222_{1c}$;

p couplers $202_1$, ..., $202_p$ each having N/p inputs and one output; the inputs are connected to N/p respective outputs of a group of optical gates $201_1$, ..., $201_N$ of the space selector stage;

a cyclic first array of waveguides 203 having q inputs, where q is greater than p; p of the q inputs of the array are connected to p respective outputs of the couplers $202_1$, ..., $202_p$;

a carrier subset selector stage consisting of B optical gates $204_1$, ..., $204_B$ having their inputs connected to B respective outputs of the array 203;

m/B couplers $205_1$, ..., $205_p$ each having $B^2/m$ inputs and one output, the $B^2/m$ inputs being connected to respective outputs of the array of waveguides 203 via optical gates $204_i$; and a cyclic second array of waveguides 206 having m/B inputs connected to m/B respective outputs of the couplers $205_1$, ..., $205_{m/B}$ and having m/B outputs constituting the outputs of the unit $222_{1c}$.

In the examples shown, N'=2, N=8, B'=2, B=4, p=4, q=5, m=8. The numbers m/B and q must be prime to each other. FIG. 10 shows how this embodiment works in the case of routing a subset $S_{24}$ consisting of two carriers $\lambda_4$ and $\lambda_9$ from eight carriers $\lambda_1$, $\lambda_2$, $\lambda_3$, $\lambda_4$, $\lambda_6$, $\lambda_7$, $\lambda_8$, $\lambda_9$ arriving at the second optical gate $201_2$. The references of the carriers transmitted are indicated near the outputs of the components. The outputs of the array 203 can respectively restore the following subsets of carriers:

$S_{21}$: $\lambda_1$, $\lambda_6$
$S_{22}$: $\lambda_2$, $\lambda_7$
$S_{23}$: $\lambda_3$, $\lambda_8$
$S_{24}$: $\lambda_4$, $\lambda_9$ The subset of carriers $\lambda_5$, $\lambda_{10}$ is not included in this example because it leads to an unused output of the array 203.

The outputs of the array 206 can respectively restore the following carriers:

$\lambda_2$, $\lambda_4$, $\lambda_6$, $\lambda_8$, $\lambda_{10}$
$\lambda_1$, $\lambda_3$, $\lambda_5$, $\lambda_7$, $\lambda_9$ The gate $201_2$ selects all the carriers $\lambda_1$, $\lambda_2$, $\lambda_3$, $\lambda_4$, $\lambda_6$, $\lambda_7$, $\lambda_8$, $\lambda_9$ arriving at that optical gate. It is controlled so that it allows those carriers to pass through it. The other gates $201_i$ are shut. The array 203 restores only the carriers $\lambda_4$ and $\lambda_9$ at its output connected to the gate $204_B$. The gate $204_B$ is controlled to allow those carriers to pass through it. The other gates $204_i$ are shut. The coupler $205_m$ transmits the carriers $\lambda_4$, $\lambda_9$ together to the array 206. That array demultiplexes them and restores them on two separate outputs.

FIG. 11 shows the same embodiment as FIG. 10, but indicates how it works in the case of routing other carriers, applied to the gate $202_3$, grouped into subsets $S_{31}$, $S_{32}$, $S_{33}$, $S_{34}$, as follows:

S31: $\lambda_2$, $\lambda_7$
S32: $\lambda_3$, $\lambda_8$
S33: $\lambda_4$, $\lambda_9$
S34: $\lambda_5$, $\lambda_{10}$ The comb of carriers is shifted for each input port of the array 203. Consequently, the comb of carriers arriving at the gate $201_3$ is $\lambda_2$, $\lambda_3$, $\lambda_4$, $\lambda_5$, $\lambda_7$, $\lambda_8$, $\lambda_9$, $\lambda_{10}$. The subset of carriers $\lambda_6$, $\lambda_{11}$ is not included in this example because it leads to an unused output of the array 203.

The gate $201_3$, for example, selects all the carriers $\lambda_2$, $\lambda_3$, $\lambda_4$, $\lambda_5$, $\lambda_7$, $\lambda_8$, $\lambda_9$, $\lambda_{10}$ arriving at the optical gate $201_3$. In this example, it is controlled so that it allows those carriers to pass through it. The other gates $201_i$ are shut. In this example, the carriers $\lambda_3$ and $\lambda_8$ can be transmitted via the port of the array 203 that is connected to that gate. The array 203 restores only the carriers $\lambda_3$ and $\lambda_8$ at its output connected to the gate $204_2$. The gate $204_2$ is controlled so that it allows those carrier to pass through it. The other gates $204_i$ are shut. The coupler $205_1$ transmits the carriers $\lambda_3$ and $\lambda_8$ together to the array 206. That array demultiplexes them and restores them on two separate outputs.

This embodiment of the switch according to the invention requires fewer optical gates than the prior art switch shown in FIG. 1. Each selector unit includes N+B optical gates, i.e. a total of N.B.(N+B) gates for the whole switch. Under these conditions, if N=16 and B=4, the total number of gates is 1 280. In a conventional switch, for which N=16 and m=16, the number of optical gates used for each selector unit is:

m.N.(m+N)=8 192.

Accordingly, in this example, the number of optical amplifiers of the switch according to the invention is less than one sixth of that in the prior art switch, all other things being equal.

FIG. 12 is a block diagram of a fourth embodiment $222_{1d}$ of the selector unit $222_1$ considered by way of example, for N=16, B=16. It includes:

a space selector stage consisting of N optical gates $301_1$, . . . , $301_N$, divided into groups of N.B/q each corresponding to a comb of wavelengths $C_1$, . . . , $C_{q/B}$ (a group of subsets of carriers);

q/B couplers $302_1$, . . . , $302_{q/B}$ each having N.B/q inputs and B outputs, the inputs of each coupler being connected to the outputs of the optical gates $301_1$, . . . , $301_N$;

q optional optical filters $303_1$, . . . , $303_q$ connected to q respective outputs of the couplers $302_1$, . . . , $302_{q/B}$;

a stage for selecting a subset of carriers, consisting of q optical gates $304_1$, . . . , $304_q$ having inputs connected to respective outputs of the filters $303_1$, . . . , $303_q$; and a demultiplexer 305 having q inputs connected to q respective outputs of the gates $303_1$, . . . , $303_q$ and having at least m/B outputs constituting the outputs of the selector unit $222_{1d}$; q is chosen to be greater than m.

The demultiplexer 305 can be implemented with an array of waveguides or with an optical filter in a "modified Littman-Metcalf" configuration. The q band-pass optical filters $303_1$, . . . , $303_q$ increase the power provided by the optical amplifiers constituting the gates by eliminating carriers of no utility from the subsets of wavelengths not required. Without these filters, the latter would consume some of the available power.

In the preferred embodiment, shown in FIG. 12, the filters are band-pass filters and the bands can therefore be adjacent. Each comb of wavelengths $C_1$, . . . , $C_{q/B}$ is shifted relative to the next comb by four wavelengths so that the array 305 routes the wavelengths of each comb correctly. The number q of inputs (and outputs) of the array 305 is equal to 16. Only m/B outputs are used to constitute the outputs connected to wavelength converter and regenerator devices $306_1$, . . . , $306_{m/B}$. Thus q-(m/B) outputs of the array 305 are not used.

It is possible to use those outputs more completely, given that access to the array 305 is bidirectional. It is possible to use the unused outputs as inputs in this fourth embodiment and also in the third embodiment (FIGS. 10 and 11).

For example, FIG. 13 is a block diagram of a variant of the fourth embodiment of the selector unit $222_{1d}$ for N=16, B=16. This variant uses the same array 310 for two switching stages $SS_{2h}$ and $SS_{2h+1}$, the array being used bidirectionally. The switching stage $SS_{2h}$ includes:

a spatial selector stage consisting of N optical gates $301'_1$, . . . , $301'_N$ divided into groups of N.B/q gates each corresponding to one comb of wavelengths;

q/B couplers $302'_1$, . . . , $302'_{q/B}$ each having N.B/q inputs and B outputs, the inputs of each coupler being connected to respective outputs of a group of N.B/q optical gates $301'_1$, . . . , $301'_N$;

q optional optical band-pass filters $303'_1$, . . . , $303'_q$ connected to q respective outputs of the couplers $302'_1$, . . . , $302'_{q/B}$;

a stage for selecting a subset of carriers, consisting of q optical gates $304'_1$, . . . , $304'_q$ having inputs connected to respective outputs of the filters $303'_1$, . . . , $303'_q$; and a demultiplexer consisting of an array of waveguides 310 having q' ports on the left-hand side, constituting:

q inputs connected to q respective outputs of the gates $303'_1$, . . . , $303'_q$, and q'-q outputs, of which m/B outputs constitute the outputs of the stage $SS_{2h+1}$, and can be connected to wavelength converter and regenerator devices $306''_1$, . . . , $306''_{m/B}$; q is chosen to be greater than m.

The switching stage $SS_{2h+1}$ includes:

a space selector stage consisting of N optical gates $301''_1, \ldots, 301''_N$ divided into groups of N.B/q gates each corresponding to one comb of wavelengths;

q/B couplers $302''_1, \ldots, 302''_{q/B}$ each having N.B/q inputs and B outputs, the inputs of each coupler being connected to respective outputs of a group of N.B/q optical gates $301''_1, \ldots, 301''_N$;

q optional optical band-pass filters $303''_1, \ldots, 303''_q$ connected to q respective outputs of the couplers $302''_1, \ldots, 302''_{q/B}$;

a stage for selecting a subset of carriers consisting of q optical gates $304''_1, \ldots, 304''_q$ having inputs connected to respective outputs of the filters $303''_1, \ldots, 303''_q$; and a demultiplexer consisting of the array of waveguides 310, crossed in the opposite direction, its right-hand side having q' ports constituting:

q inputs connected to q respective outputs of the gates $303'_1, \ldots, 303'_q$, and q'-q outputs of which m/B outputs constitute the outputs of the stage $SS_{2h}$, and can be connected to wavelength converter and regenerator devices $306'_1, \ldots, 306'_{m/B}$.

It will be evident to the skilled person how to modify the third embodiment shown in FIG. 10 in an analogous way to use the same array of waveguides for at least two separate switching stages.

One embodiment of the combs of wavelengths can include wavelengths distributed regularly; for example each subset includes four carriers with intervals all equal to 100 GHz. To reduce intermodulation phenomena due to non-linearities in the response of the amplifiers, it may be advantageous to distribute the carriers in a less regular manner, for example with each subset including four carriers with intervals of 100 GHz, 200 GHz and 100 GHz, two adjacent subsets being separated by 100 GHz. In another example, each subset includes four carriers with intervals of 200 GHz, 100 GHz, 100 GHz and two adjacent subsets are separated by 100 GHz.

What is claimed is:

1. A switch (112) for optical signals, the switch including a number of outputs at least equal to the number N of inputs, for routing an input signal to at least one output, each input being adapted to receive signals modulating optical carriers having m different wavelengths $(\lambda_1, \lambda_2, \ldots, \lambda_m)$; characterized in that it includes:

means ($126_{11}, \ldots, 126_{NB}$; $226_{11}, \ldots, 226_{NB}$) for grouping all of the carriers received at an input of the switch into non-contiguous subsets ($S_{11}, \ldots, S_{1B}$) of carriers;

selector units ($129_1, \ldots 129_{NB}$; $229_1, \ldots, 229_{NB}$) for routing in blocks ($G_{11}, \ldots, G_{NB}$) the signals corresponding to each subset of optical carriers; and means (142, 145, 150) for dividing each subset and then transmitting all the carriers of that subset to the same output of the switch.

2. A switch according to claim 1, characterized in that it further includes:

means ($226_1, \ldots, 226_N$) for grouping all the subsets ($S_{11}, \ldots, S_{1B}$) of carriers into non-contiguous groups ($SG_1, \ldots, SG_N$) of subsets;

means ($229_1, \ldots, 229_{NB}$) for routing in blocks ($H_1, \ldots, H_N$) the information corresponding to a plurality of subsets of carriers; and means (44, 45, 46; 54, 55; 206; 305; 310) for selecting a single subset of carriers per output of the switch.

3. A switch according to claim 1, characterized in that it includes means ($124_1, \ldots, 124_B$) for converting the wavelengths of the carriers of each subset into predetermined wavelengths ($\lambda'_1, \ldots, \lambda'_{m/B}$) in a spectral window substantially narrower than the window of the m wavelengths at the input of the switch, in order for the selector units ($129_1, 129_2, \ldots, 129_{NB}$) to process wavelengths over a spectral window smaller than the spectral window of the m wavelengths at the input of the switch.

4. A switch according to claim 3, characterized in that it includes converter means after the selector units ($129_1, 129_2, \ldots, 129_{NB}$) for converting the wavelengths ($\lambda'_1, \lambda'_2, \ldots, \lambda'_{m/B}$) of the carriers of each subset ($S_{11}, \ldots, S_{NB}$) selected.

5. A switch according to claim 1, characterized in that it includes N.B selector units ($122_1, \ldots, 122_{NB}$), where N is the number of inputs of the switch and B is the number of subsets of carriers received at the same input, and in that each selector unit ($122_1, \ldots, 122_{NB}$) includes N.B optical amplifiers ($132_1, \ldots, 132_{NB}$) each associated with a corresponding input of the selector unit, said optical amplifier being activated to transmit the signal applied to its input.

6. A switch according to claim 1, characterized in that it further includes variable delay means ($130_{11}, 130_{12}, \ldots, 130_{N^2B^2}$) associated with each selector unit ($129_1, 129_2, \ldots, 129_{NB}$) and controlled so as to delay the signal ($G_{11}, \ldots, G_{1B}, \ldots, G_{N1}, \ldots, G_{NB}$) selected by said unit as a function of the priority accorded to said signal.

7. A switch according to claim 1, characterized in that it further includes amplifier means (128) on the input side of the selector units ($129_1, 129_2, \ldots, 129_{NB}$) for amplifying the subsets of carriers.

8. A switch according to claim 2, characterized in that a selector unit ($222_{1a}$) includes:

N optical gates ($41_1, \ldots, 41_N$) coupling N respective inputs of the selector unit to a coupler (42) having N inputs and one output;

a demultiplexer (44) having an input coupled to the output of the coupler (42) and having N outputs;

N optical gates ($45_1, \ldots, 45_m$) coupled to respective outputs of the demultiplexer (44); and m/B multiplexers ($46_1, \ldots, 46_{m/B}$) each having B inputs and one output, each input being connected to a respective output of the demultiplexer (44), and the m/B outputs of said demultiplexers constituting the outputs of the selector unit.

9. A switch according to claim 2, characterized in that a selector unit ($222_{1b}$) includes:

N optical gates ($50_1, \ldots, 50_N$) divided into groups of N/p gates; each group of N/p gates is coupled to N/p respective inputs of the selector unit (221b);

p couplers ($51_1, \ldots, 51_p$) each having N/p inputs coupled to N/p gates and having one output;

p optical gates ($52_1, \ldots, 52_p$) having their inputs coupled to respective outputs of the couplers ($51_1, \ldots, 51_p$);

a coupler (53) having p inputs connected to respective outputs of the gates ($52_1, \ldots, 52_p$) and having B outputs;

B optical gates ($54_1, \ldots, 54_B$) having their inputs coupled to respective outputs of the couplers (53); and a demultiplexer device (55) having B inputs connected to respective outputs of B optical gates ($54_1, \ldots, 54_B$) and having m/B outputs coupled to the outputs of the selector unit ($222_{1b}$).

10. A switch according to claim 2, characterized in that a selector unit ($222_{1c}$) includes:

a space selector stage including N optical gates ($201_1, \ldots, 201_N$) divided into groups of N/p gates, said gates being coupled to N respective inputs of the selector unit ($222_{1c}$);

p couplers ($202_1, \ldots, 202_p$) each having N/p inputs and one output, said inputs being coupled to N/p respective outputs of a group of optical gates ($201_1, \ldots, 201_N$) of the space selector stage;

a cyclic first array of waveguides (203) having q inputs, where q is greater than p, p inputs of the q inputs of said array being coupled to p respective outputs of the couplers ($202_1, \ldots, 202_p$);

a stage for selecting subsets of carriers including B optical gates ($204_1, \ldots, 204_B$) having their inputs connected to B respective outputs of the first array of waveguides (203);

m/B couplers ($205_1, \ldots, 205_p$) each having $B^2/m$ inputs and one output, said $B^2/m$ inputs being coupled to respective outputs of the first array of waveguides (203) via optical gates ($204_i$); and a cyclic second array of waveguides (206) having m/B inputs coupled to m/B respective outputs of the couplers ($205_1, \ldots, 205_{m/B}$) and having m/B outputs coupled to the outputs of the selector unit ($222_{1c}$).

11. A switch according to claim 2, characterized in that a selector unit ($222_{1d}$) includes:

a space selector stage including N optical gates ($301_1, \ldots, 301_N$) divided into groups of N.B/q gates each corresponding to a comb of wavelengths;

q/B couplers ($302_1, \ldots, 302_{q/B}$) each having N.B/q inputs and B outputs, the inputs of each coupler being coupled to the outputs of the optical gates ($301_1, \ldots, 301_N$) of the space selector stage;

a stage for selecting a subset of carriers consisting of q optical gates ($304_1, \ldots, 304_q$) having inputs connected to respective outputs of the couplers ($302_1, \ldots, 302_{q/B}$); and a demultiplexer (305) having q inputs connected to q respective outputs of the gates ($303_1, \ldots, 303_q$) of the stage for selecting a subset of carriers and having at least m/B outputs coupled to the outputs of the selector unit ($222_{1d}$), q being chosen to be greater than m.

12. A switch according to claim 11, characterized in that a selector unit uses the same array (310) for two switching stages ($SS_{2h}, SS_{2h+1}$), said array being used bidirectionally.

13. A switch according to claim 11, characterized in that a selector unit ($222_{1d}$) further includes q optical filters ($303_1, \ldots, 303_q$) coupling q respective outputs of the couplers ($302_1, \ldots, 302_{q/B}$) to the inputs of the q optical gates ($304_1, \ldots, 304_q$) of the stage for selecting a subset of carriers.

* * * * *